US010805832B2

(12) United States Patent
Lee et al.

(10) Patent No.: US 10,805,832 B2
(45) Date of Patent: Oct. 13, 2020

(54) METHOD AND APPARATUS FOR HANDLING COEXISTENCE WITH DSRC CARRIER IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/276,415

(22) Filed: Feb. 14, 2019

(65) Prior Publication Data

US 2019/0253958 A1    Aug. 15, 2019

Related U.S. Application Data

(60) Provisional application No. 62/630,275, filed on Feb. 14, 2018.

(51) Int. Cl.
| | | |
|---|---|---|
| *H04W 28/02* | (2009.01) | |
| *H04W 48/16* | (2009.01) | |
| *H04W 72/04* | (2009.01) | |
| *H04W 76/15* | (2018.01) | |
| *H04W 72/08* | (2009.01) | |

(Continued)

(52) U.S. Cl.
CPC ....... *H04W 28/0289* (2013.01); *H04W 16/14* (2013.01); *H04W 48/16* (2013.01); *H04W 48/20* (2013.01); *H04W 56/0095* (2013.01); *H04W 72/0453* (2013.01); *H04W 72/082* (2013.01); *H04W 76/15* (2018.02); *H04W 88/06* (2013.01)

(58) Field of Classification Search
CPC . H04W 28/0289; H04W 48/20; H04W 16/14; H04W 56/0095; H04W 72/082
See application file for complete search history.

(56) References Cited

U.S. PATENT DOCUMENTS

| | | | |
|---|---|---|---|
| 2014/0313890 A1* | 10/2014 | Shrote | H04W 72/1231 370/230 |
| 2017/0188391 A1* | 6/2017 | Rajagopal | H04W 74/0816 |

(Continued)

OTHER PUBLICATIONS

LG Electronics; "Considerations on the co-channel coexistence of multiple RATs for V2X"; 3GPP TSG RAN WG1 Meeting #86bis Lisbon, Portugal Oct. 10-14, 2016; R1-1609185 (Year: 2016).*
Intel Corporation; "Design considerations on LTE-V2V coexistence with DSRC technology"; 3GPP TSG RAN WG1 Meeting #86bis Lisbon, Portugal, Oct. 10-14, 2016; R1-1609458 (Year: 2016).*

(Continued)

*Primary Examiner* — Gary Mui
(74) *Attorney, Agent, or Firm* — Lee, Hong, Degerman Kang & Waimey

(57) ABSTRACT

A method and apparatus for handling coexistence with a dedicated short range communication (DSRC) carrier in a wireless communication system is provided. A user equipment (UE) obtains a first congestion level on a resource set for a first radio technology, determines a second congestion level for the first radio technology by applying an offset to the first congestion level when a second radio technology which shares the resource set with the first radio technology is identified, selects a carrier based on the second congestion level for the first radio technology, and performs transmission on the selected carrier.

15 Claims, 5 Drawing Sheets

(51) Int. Cl.
*H04W 56/00* (2009.01)
*H04W 16/14* (2009.01)
*H04W 48/20* (2009.01)
*H04W 88/06* (2009.01)

(56) References Cited

U.S. PATENT DOCUMENTS

| | | | | |
|---|---|---|---|---|
| 2017/0280445 | A1* | 9/2017 | Jiang | H04L 47/27 |
| 2018/0014146 | A1* | 1/2018 | Gulati | H04W 76/14 |
| 2018/0014317 | A1* | 1/2018 | Gulati | H04W 16/14 |
| 2018/0048577 | A1* | 2/2018 | Gulati | H04L 47/24 |
| 2018/0234889 | A1* | 8/2018 | Baghel | H04W 72/06 |
| 2019/0116475 | A1* | 4/2019 | Lee | H04W 4/40 |
| 2019/0174547 | A1* | 6/2019 | Khoryaev | H04B 17/318 |
| 2019/0215801 | A1* | 7/2019 | Mok | H04W 74/0816 |
| 2019/0253946 | A1* | 8/2019 | Hahn | H04W 36/0016 |
| 2019/0313279 | A1* | 10/2019 | Li | H04L 47/762 |
| 2019/0387530 | A1* | 12/2019 | Tang | H04W 72/02 |

OTHER PUBLICATIONS

LG Electronics; "Discussion on coexisting LTE-V2V and IEEE802.11p on the same carrier"; 3GPP TSG RAN WG1 Meeting #85 Nanjing, China, May 23-27, 2016; R1-164540 (Year: 2016).*

Huawei, Hlsilicon; "Discussion on the TX carrier selection for PC5 CA"; 3GPP TSG-RAN WG2 Meeting#100 Reno, USA, Nov. 27-Dec. 1, 2017; R2-1712751 (Year: 2017).*

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall Description; Stage 2 (Release 15)," 3GPP TS 36.300 V15.0.0, Dec. 2017, 338 pages.

3rd Generation Partnership Project (3GPP), "Technical Specification Group Radio Access Network; Evolved Universal Terrestrial Radio Access (E-UTRA); Radio Resource Control (RRC); Protocol specification (Release 15)," 3GPP TS 36.331 V15.0.0, Dec. 2017, 776 pages.

* cited by examiner

[FIG. 1]
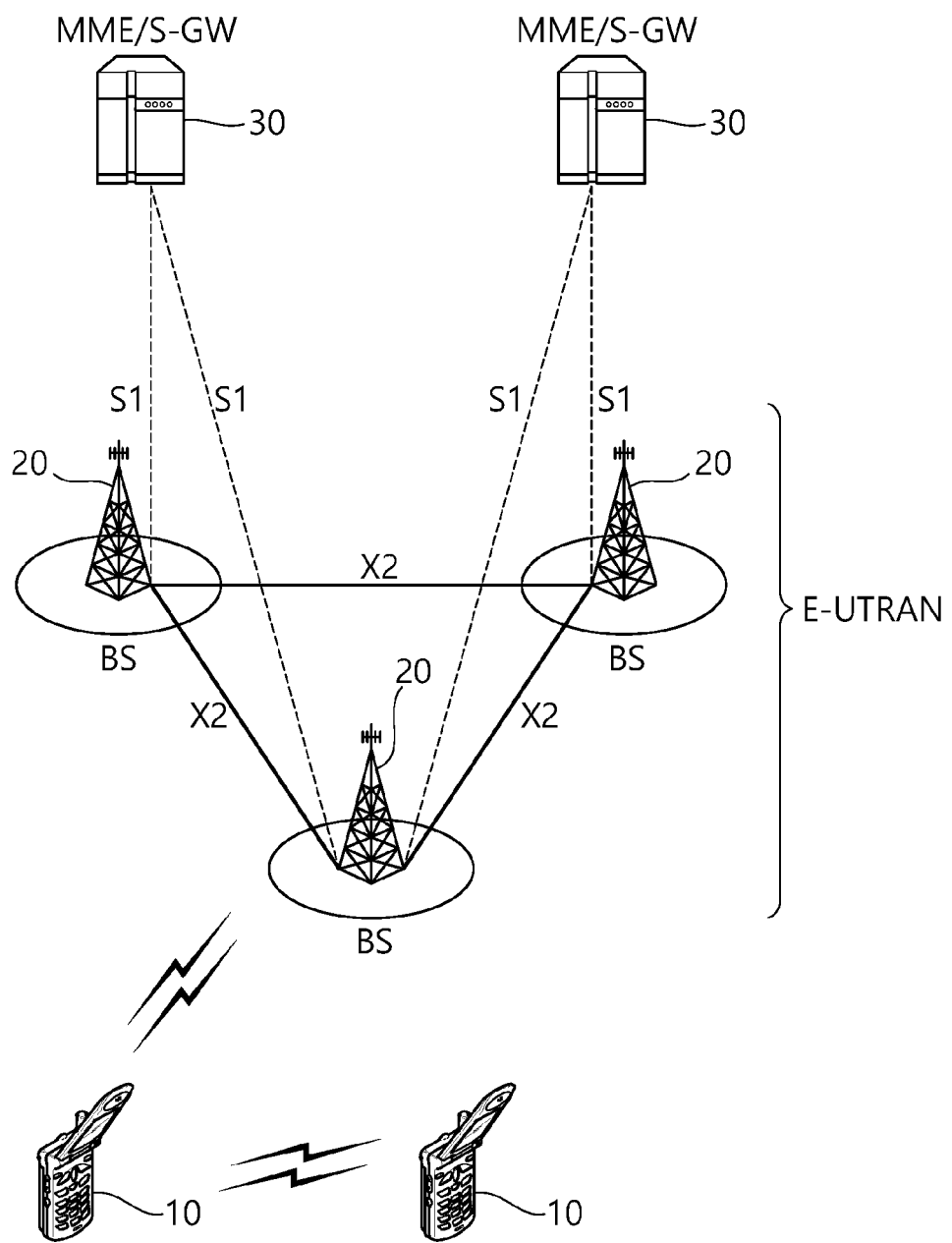

[FIG. 2]
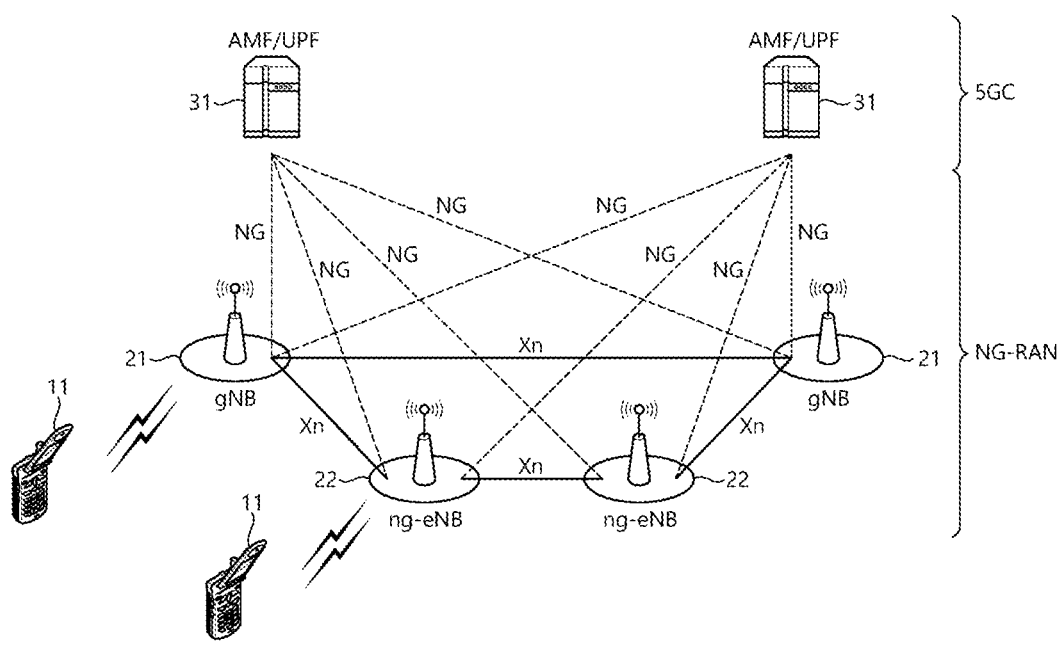

[FIG. 3]
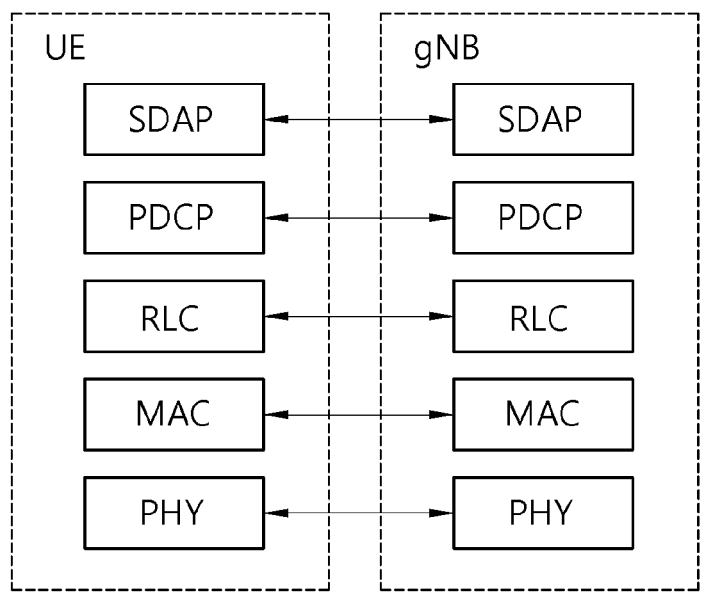
[FIG. 4]
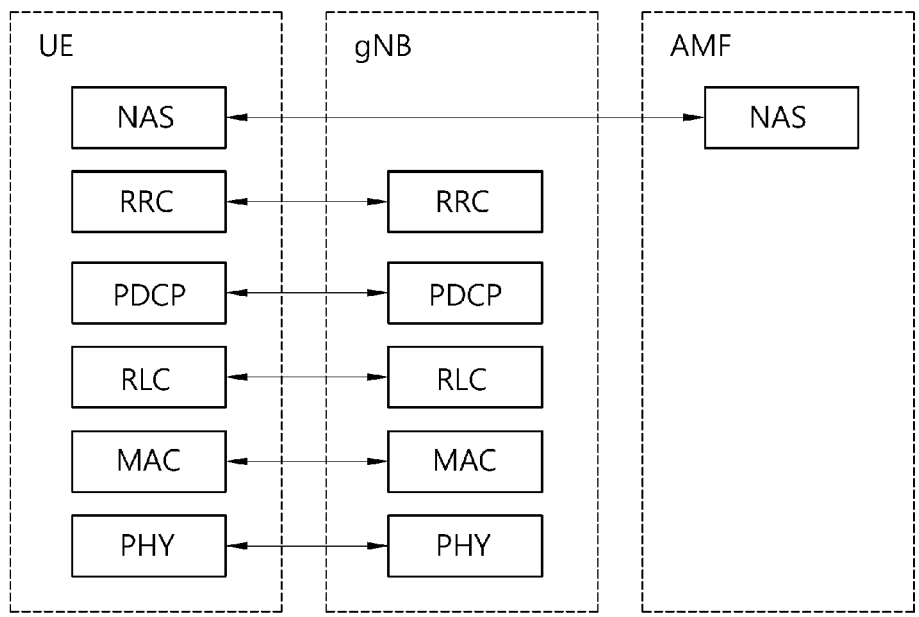

[FIG. 5]
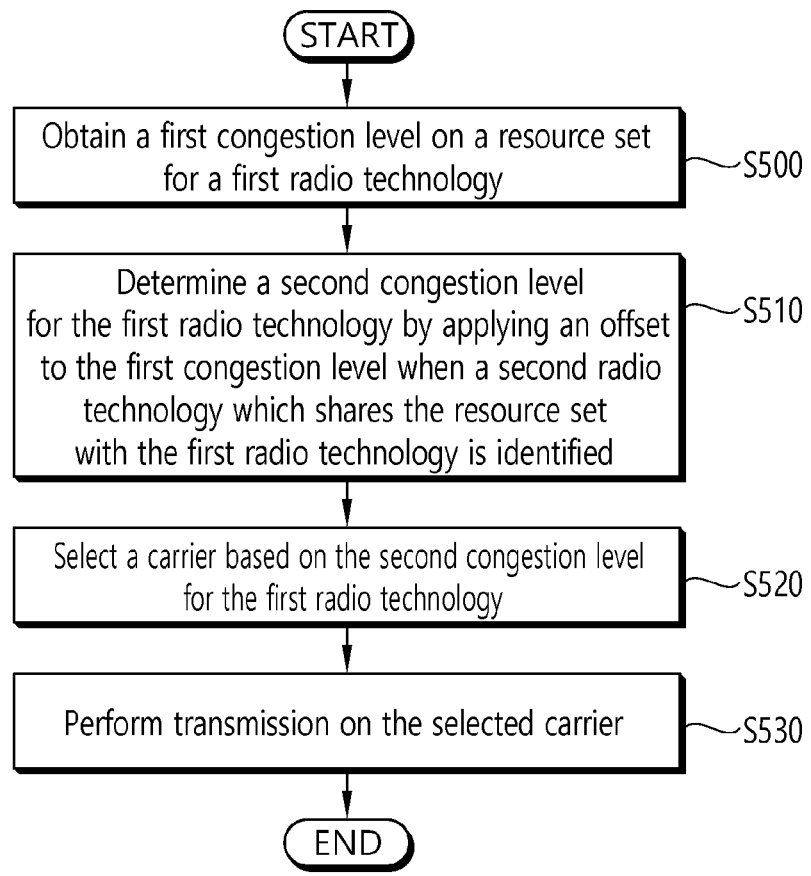
[FIG. 6]
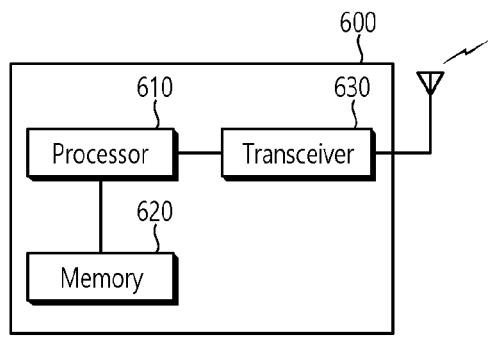

[FIG. 7]
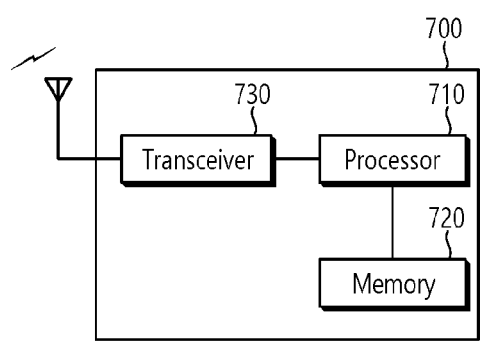

METHOD AND APPARATUS FOR HANDLING COEXISTENCE WITH DSRC CARRIER IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/630,275, filed on Feb. 14, 2018, the contents of which are hereby incorporated by reference herein in its entirety.

BACKGROUND OF THE INVENTION

Field of the Invention

The present invention relates to wireless communications, and more particularly, to a method and apparatus for handling coexistence with a dedicated short range communication (DSRC) carrier in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

The main motivations for V2X are road safety, traffic efficiency, and energy savings. There are two types of V2X communication technology depending on the underlying technology being used, i.e. wireless local area network (WLAN)-based, and cellular-based.

Standardization of WLAN-based V2X supersedes that of cellular-based V2X systems. The institute of electrical and electronics engineers (IEEE) first published the specification of WLAN-based V2X (IEEE 802.11p) in 2012. It supports direct communication between vehicles (V2V) and between vehicles and infrastructure (V2I). Dedicated short range communication (DSRC) uses the underlying radio communication provided by 802.11p.

In 2016, 3GPP published V2X specifications based on LTE as the underlying technology. It is generally referred to as "cellular V2X" (C-V2X) to differentiate itself from the 802.11p based V2X technology. In addition to the direct communication (V2V, V2I), C-V2X also supports wide area communication over a cellular network (V2N). This additional mode of communication and native migration path to 5G are two main advantages over 802.11p based V2X system.

SUMMARY OF THE INVENTION

Carrier aggregation (CA) in sidelink for V2X sidelink communication may be supported. For actual transmission, a carrier may be initially selected or re-selected among aggregated carriers for V2X sidelink communication. Various factor can be considered for transmission carrier selection. Coexistence with other radio technology (i.e. DSRC) which shares the same resource should also be considered for transmission carrier selection.

In an aspect, a method performed by a user equipment (UE) in a wireless communication system is provided. The method includes obtaining a first congestion level on a resource set for a first radio technology, determining a second congestion level for the first radio technology by applying an offset to the first congestion level when a second radio technology which shares the resource set with the first radio technology is identified, selecting a carrier based on the second congestion level for the first radio technology, and performing transmission on the selected carrier.

In another aspect, a user equipment (UE) in a wireless communication system is provided. The UE includes a memory, a transceiver, and a processor, operably coupled tot the memory and the transceiver, and configured to obtain a first congestion level on a resource set for a first radio technology, determine a second congestion level for the first radio technology by applying an offset to the first congestion level when a second radio technology which shares the resource set with the first radio technology is identified, select a carrier based on the second congestion level for the first radio technology; and control the transceiver to perform transmission on the selected carrier.

BRIEF DESCRIPTION OF THE DRAWINGS

FIG. 1 shows an example of a wireless communication system to which technical features of the present invention can be applied.

FIG. 2 shows another example of a wireless communication system to which technical features of the present invention can be applied.

FIG. 3 shows a block diagram of a user plane protocol stack to which technical features of the present invention can be applied.

FIG. 4 shows a block diagram of a control plane protocol stack to which technical features of the present invention can be applied.

FIG. 5 shows a method for handling coexistence with DSRC carrier according to an embodiment of the present invention.

FIG. 6 shows a UE to implement an embodiment of the present invention. The present invention described above for UE side may be applied to this embodiment.

FIG. 7 shows a network node to implement an embodiment of the present invention.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Sidelink communication is described. It may be referred to as Section 23.10 of 3GPP TS 36.300 V15.0.0 (2017-12). Sidelink is a UE to UE interface for sidelink communication, vehicle-to-everything (V2X) sidelink communication and sidelink discovery. The Sidelink corresponds to the PC5 interface. Sidelink transmissions are defined for sidelink discovery, sidelink communication and V2X sidelink communication between UEs. The sidelink transmissions use the same frame structure as the frame structure that is defined for UL and DL when UEs are in network coverage. However, the sidelink transmission are restricted to a sub-set of the UL resources in time and frequency domain. Various physical channels, transport channels and logical channels may be defined for sidelink transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication. The terminology "sidelink communication" without "V2X" prefix may only concern public safety unless specifically stated otherwise.

In order to perform synchronization for out of coverage operation, UE(s) may act as a synchronization source by transmitting sidelink broadcast control channel (SBCCH) and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the BS. When the UE is out of coverage, if the UE selects another UE as a synchronization reference, then the content of SBCCH is derived from the received SBCCH. Otherwise UE uses pre-configured parameters. SIB 18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g. modulation and coding scheme (MCS), location of the resource(s) over the duration of SC period, timing alignment).

The UE performs transmission and reception over Uu and PC5 with the following decreasing priority order in case sidelink discovery gap is not configured:
  Uu transmission/reception (highest priority);
  PC5 sidelink communication transmission/reception;
  PC5 sidelink discovery announcement/monitoring (lowest priority).

The UE performs transmission and reception over Uu and PC5 with the following decreasing priority order in case sidelink discovery gap is configured:
  Uu transmission/reception for RACH;
  PC5 sidelink discovery announcement during a sidelink discovery gap for transmission;
  Non-RACH Uu transmission;

PC5 sidelink discovery monitoring during a sidelink discovery gap for reception;

Non-RACH Uu reception;

PC5 sidelink communication transmission/reception.

The UE supporting sidelink communication can operate in two modes for resource allocation. The first mode is a scheduled resource allocation, which may be referred to as "Mode 1" for resource allocation of sidelink communication. In the Mode 1, the UE needs to be RRC_CONNECTED in order to transmit data. The UE requests transmission resources from the BS. The BS schedules transmission resources for transmission of sidelink control information and sidelink data. The UE sends a scheduling request (dedicated scheduling request (D-SR) or random access) to the BS followed by a sidelink buffer status report (BSR). Based on the sidelink BSR, the BS can determine that the UE has data for a sidelink communication transmission and estimate the resources needed for transmission. The BS can schedule transmission resources for sidelink communication using configured sidelink radio network temporary identity (SL-RNTI).

The second mode is a UE autonomous resource selection, which may be referred to as "Mode 2" for resource allocation of sidelink communication. In the Mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more ProSe per-packet priority (PPPP) associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool. Once the resource pool is selected, the selection is valid for the entire SC period. After the SC period is finished, the UE may perform resource pool selection again. The UE is allowed to perform multiple transmissions to different destinations in a single SC period.

A UE in RRC_CONNECTED may send a sidelink UE information message to BS when UE becomes interested in sidelink communication. In response, BS may configure the UE with a SL-RNTI.

V2X sidelink communication is described. It may be referred to as Section 23.14 of 3GPP TS 36.300 V15.0.0 (2017-12) and Section 5.10.13 of 3GPP TS 36.331 V15.0.0 (2017-12). V2X services can consist of the following four different types, i.e. vehicle-to-vehicle (V2V), vehicle-to-infrastructure (V2I), vehicle-to-nomadic (V2N) and vehicle-to-pedestrian (V2P).

V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

The user plane protocol stack and functions for sidelink communication are also used for V2X sidelink communication. In addition, for V2X sidelink communication:

Sidelink traffic channel (STCH) for sidelink communication is also used for V2X sidelink communication.

Non-V2X (e.g. public safety) data is not multiplexed with V2X data transmitted in resources configured for V2X sidelink communication.

The AS is provided with the PPPP of a protocol data unit transmitted over PC5 interface by higher layers. The packet delay budget (PDB) of the protocol data unit can be determined from the PPPP. The low PDB is mapped to the high priority PPPP value.

The existing logical channel prioritization based on PPPP is used for V2X sidelink communication.

Control plane protocol stack for SBCCH for sidelink communication is also used for V2X sidelink communication.

The UE supporting V2X sidelink communication can operate in two modes for resource allocation. The first mode is a scheduled resource allocation, which may be referred to as "Mode 3" for resource allocation of V2X sidelink communication. In the Mode 3, the UE needs to be RRC_CONNECTED in order to transmit data. The UE requests transmission resources from the BS. The BS schedules transmission resources for transmission of sidelink control information and data. Sidelink semi-persistent scheduling (SPS) is supported for the Mode 3.

The second mode is a UE autonomous resource selection, which may be referred to as "Mode 4" for resource allocation of V2X sidelink communication. In the Mode 4, the UE on its own selects resources from resource pools and performs transport format selection to transmit sidelink control information and data. If mapping between the zones and V2X sidelink transmission resource pools is configured, the UE selects V2X sidelink resource pool based on the zone UE is located in. The UE performs sensing for (re)selection of sidelink resources. Based on sensing results, the UE (re)selects some specific sidelink resources and reserves multiple sidelink resources. Up to 2 parallel independent resource reservation processes are allowed to be performed by the UE. The UE is also allowed to perform a single resource selection for its V2X sidelink transmission.

An RRC_CONNECTED UE may send a sidelink UE information message to the serving cell if it is interested in V2X sidelink communication transmission in order to request sidelink resources.

For controlling channel utilization, the network is able to indicate how the UE adapts its transmission parameters for each transmission pool depending on the channel busy ratio (CBR). The UE measures all the configured transmission pools including exceptional pool. If a pool is (pre)configured such that a UE shall always transmit physical sidelink control channel (PSCCH) and physical sidelink shared channel (PSSCH) in adjacent resource blocks the UE measures PSCCH and PSSCH resources together. If a pool is (pre)configured such that a UE may transmit PSCCH and the corresponding PSSCH in non-adjacent resource blocks in a subframe then PSSCH pool and PSCCH pool are measured separately.

A UE in RRC_CONNECTED can be configured to report CBR measurement results. For CBR reporting, periodic reporting and event triggered reporting are supported. Two new reporting events are introduced for event-triggered CBR reporting. In case PSSCH and PSCCH resources are placed non-adjacently, only PSSCH pool measurement is used for event-triggered CBR reporting. In case PSSCH and PSCCH resources are placed adjacently, CBR measurement of both the PSSCH and PSCCH resources is used for event-triggered CBR reporting. CBR event-triggered reporting is triggered by overloaded threshold and/or less-loaded threshold. The network can configure which of the transmission pools the UE needs to report.

A UE (regardless of its RRC state) performs transmission parameter adaptation based on the CBR. When CBR measurements are not available, the default transmission parameters are used. The exemplary adapted transmission parameters include maximum transmission power, range of the number of retransmission per transport block (TB), range of PSSCH resource block (RB) number, range of MCS, maximum limit on channel occupancy ratio. The transmission parameter adaption applies to all transmission pools including exceptional pool.

If the UE supports multiple transmission chains, it may simultaneously transmit on multiple carriers via PC5. For the case where multiple frequencies for V2X are supported, a mapping between V2X service types and V2X frequencies is configured by upper layers. The UE should ensure a V2X service to be transmitted on the corresponding frequency. For the Mode 3, the BS can schedule a V2X transmission on a frequency based on the sidelink BSR, in which the UE includes the destination index uniquely associated with a frequency reported by the UE to the BS in sidelink UE information message.

A UE capable of V2X sidelink communication that is configured by upper layers to transmit V2X sidelink communication and has related data to be transmitted shall:
1> if the conditions for sidelink operation are met:
2> if in coverage on the frequency used for V2X sidelink communication; or
2> if the frequency used to transmit V2X sidelink communication is included in v2x-InterFreqInfoList in RRCConnectionReconfiguration or in v2x-InterFreqInfoList within SystemInformationBlockType21:
3> if the UE is in RRC_CONNECTED and uses the primary cell (PCell) or the frequency included in v2x-InterFreqInfoList in RRCConnectionReconfiguration for V2X sidelink communication:
4> if the UE is configured, by the current PCell with commTxResources set to scheduled:
5> if T310 or T311 is running; and if the PCell at which the UE detected physical layer problems or radio link failure broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21 or RRCConnectionReconfiguration; or
5> if T301 is running and the cell on which the UE initiated connection re-establishment broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21; or
5> if T304 is running and the UE is configured with v2x-CommTxPoolExceptional included in mobilityControlInfoV2X in RRCConnectionReconfiguration or in v2x-InterFreqInfoList for the concerned frequency in RRCConnectionReconfiguration:
6> configure lower layers to transmit the sidelink control information and the corresponding data based on random selection using the pool of resources indicated by v2x-CommTxPoolExceptional;
5> else:
6> configure lower layers to request E-UTRAN to assign transmission resources for V2X sidelink communication;
4> else if the UE is configured with v2x-CommTxPoolNormalDedicated or v2x-CommTxPoolNormal in the entry of v2x-InterFreqInfoList for the concerned frequency in sl-V2X-ConfigDedicated in RRCConnectionReconfiguration and the UE is configured to transmit non-pedestrian-to-everything (P2X) related V2X sidelink communication:
5> if a result of sensing on the resources configured in v2x-CommTxPoolNormalDedicated or v2x-CommTxPoolNormal in the entry of v2x-InterFreqInfoList for the concerned frequency in RRCConnectionReconfiguration is not available:
6> if v2x-CommTxPoolExceptional is included in mobilityControlInfoV2X in RRCConnectionReconfiguration (i.e., handover case); or
6> if v2x-CommTxPoolExceptional is included in the entry of v2x-InterFreqInfoList for the concerned frequency in RRCConnectionReconfiguration; or
6> if the PCell broadcasts SystemInformationBlockType21 including v2x-CommTxPoolExceptional in sl-V2X-ConfigCommon or v2x-CommTxPoolExceptional in v2x-InterFreqInfoList for the concerned frequency:
7> configure lower layers to transmit the sidelink control information and the corresponding data based on random selection using the pool of resources indicated by v2x-CommTxPoolExceptional;
5> else:
6> configure lower layers to transmit the sidelink control information and the corresponding data based on sensing using one of the resource pools indicated by v2x-commTxPoolNormalDedicated or v2x-CommTxPoolNormal in the entry of v2x-InterFreqInfoList for the concerned frequency;
4> else if the UE is configured with v2x-CommTxPoolNormalDedicated in sl-V2X-ConfigDedicated or p2x-CommTxPoolNormal in the entry of v2x-InterFreqInfoList for the concerned frequency in RRCConnectionReconfiguration and the UE is configured to transmit P2X related V2X sidelink communication:
5> select a resource pool;
5> transmit P2X related V2X sidelink communication;
3> else:
4> if the cell chosen for V2X sidelink communication transmission broadcasts SystemInformationBlockType21:
5> if the UE is configured to transmit non-P2X related V2X sidelink communication, and if SystemInformationBlockType21 includes v2x-CommTxPoolNormalCommon or v2x-CommTxPoolNormal in v2x-InterFreqInfoList for the concerned frequency in sl-V2X-ConfigCommon and a result of sensing on the resources configured in v2x-CommTxPoolNormalCommon or v2x-CommTxPoolNormal in v2x-InterFreqInfoList for the concerned frequency is available:
6> configure lower layers to transmit the sidelink control information and the corresponding data based on sensing using one of the resource pools indicated by v2x-CommTxPoolNormalCommon or v2x-CommTxPoolNormal in v2x-InterFreqInfoList for the concerned frequency;
5> if the UE is configured to transmit P2X related V2X sidelink communication, and if SystemInformationBlockType21 includes p2x-CommTxPoolNormalCommon or p2x-CommTxPoolNormal in v2x-InterFreqInfoList for the concerned frequency in sl-V2X-ConfigCommon:
6> select a resource pool from p2x-CommTxPoolNormalCommon or p2x-CommTxPoolNormal in v2x-InterFreqInfoList for the concerned frequency, but ignoring zoneConfig in SystemInformationBlockType21;
6> transmit P2X related V2X sidelink communication;
5> if SystemInformationBlockType21 includes v2x-CommTxPoolExceptional in sl-V2X-ConfigCommon or v2x-CommTxPoolExceptional in v2x-InterFreqInfoList for the concerned frequency:

6> from the moment the UE initiates connection establishment until receiving an RRCConnectionReconfiguration including sl-V2X-ConfigDedicated, or until receiving an RRCConnectionRelease or an RRCConnectionReject; or 6> if the UE is in RRC_IDLE and a result of sensing on the resources configured in v2x-CommTxPoolNormalCommon or v2x-CommTxPoolNormal in v2x-InterFreqInfoList for the concerned frequency in Systeminformationblocktype21 is not available:

7> configure lower layers to transmit the sidelink control information and the corresponding data based on random selection using the pool of resources indicated in v2x-CommTxPoolExceptional;

2> else:

3> configure lower layers to transmit the sidelink control information and the corresponding data based on sensing using one of the resource pools indicated by v2x-CommTx-PoolList in SL-V2X-Preconfiguration in case of non-P2X related V2X sidelink communication, or using one of the resource pools indicated by p2x-CommTxPoolList in SL-V2X-P reconfiguration in case of P2X related V2X sidelink communication, and in accordance with the timing of the selected reference;

The UE capable of non-P2X related V2X sidelink communication that is configured by upper layers to transmit V2X sidelink communication shall perform sensing on all pools of resources which may be used for transmission of the sidelink control information and the corresponding data. The pools of resources are indicated by SL-V2X-Preconfiguration, v2x-CommTxPoolNormalCommon, v2x-CommTx-PoolNormalDedicated in sl-V2X-ConfigDedicated, or v2x-CommTxPoolNormal in v2x-InterFreqInfoList for the concerned frequency, as configured above.

If there are multiple frequencies for which normal or exceptional pools are configured, it is up to UE implementation which frequency is selected for V2X sidelink communication transmission.

A UE configured to transmit P2X related V2X sidelink communication shall:

1> if partialSensing is included and randomSelection is not included in resourceSelectionConfigP2X of the pool selected; or 1> if both partialSensing and randomSelection is included in resourceSelectionConfigP2X of the pool selected, and the UE selects to use partial sensing:

2> configure lower layers to transmit the sidelink control information and the corresponding data based on partial sensing using the selected resource pool, if the UE supports partial sensing;

1> if partialSensing is not included and randomSelection is included in resourceSelectionConfigP2X of the pool selected; or 1> if both partialSensing and randomSelection is included in resourceSelectionConfigP2X of the pool selected, and the UE selects to use random selection:

2> configure lower layers to transmit the sidelink control information and the corresponding data based on random selection using the selected resource pool;

For a frequency used for V2X sidelink communication, if zoneConfig is not ignored, the UE configured by upper layers for V2X sidelink communication shall only use the pool which corresponds to geographical coordinates of the UE, if zoneConfig is included in SystemInformationBlockType21 of the serving cell (RRC_IDLE)/PCell (RRC_CONNECTED) or in RRCConnectionReconfiguration for the concerned frequency, and the UE is configured to use resource pools provided by RRC signaling for the concerned frequency; or if zoneConfig is included in SL-V2X-Preconfiguration for the concerned frequency, and the UE is configured to use resource pools in SL-V2X-P reconfiguration for the frequency. The UE shall only use the pool which is associated with the synchronization reference source.

1> if the UE is configured to transmit on p2x-CommTx-PoolNormalCommon or on p2x-CommTxPoolNormal in v2x-InterFreqInfoList in SystemInformationBlockType21; or 1> if the UE is configured to transmit on p2x-CommTx-PoolList-r14 in SL-V2X-Preconfiguration; or 1> if zoneConfig is not included in SystemInformationBlockType21 and the UE is configured to transmit on v2x-CommTxPoolNormalCommon or v2x-CommTxPoolNormalDedicated; or 1> if zoneConfig is included in SystemInformationBlockType21 and the UE is configured to transmit on v2x-CommTxPoolNormalDedicated for P2X related V2X sidelink communication and zoneID is not included in v2x-CommTxPoolNormalDedicated; or 1> if zoneConfig is not included in the entry of v2x-InterFreqInfoList for the concerned frequency and the UE is configured to transmit on v2x-CommTxPoolNormal in v2x-InterFreqInfoList or p2x-CommTxPoolNormal in v2x-InterFreqInfoList in RRCConnectionReconfiguration; or 1> if zoneConfig is not included in SL-V2X-Preconfiguration for the concerned frequency and the UE is configured to transmit on v2x-CommTxPoolList in SL-V2X-Preconfiguration for the concerned frequency:

2> select the first pool associated with the synchronization reference source;

1> if zoneConfig is included in SystemInformationBlockType21 and the UE is configured to transmit on v2x-CommTxPoolNormalCommon or v2x-CommTxPoolNormalDedicated for non-P2X related V2X sidelink communication; or 1> if zoneConfig is included in SystemInformationBlockType21 and the UE is configured to transmit on v2x-CommTxPoolNormalDedicated for P2X related V2X sidelink communication and zoneID is included in v2x-CommTxPoolNormalDedicated; or 1> if zoneConfig is included in the entry of v2x-InterFreqInfoList for the concerned frequency and the UE is configured to transmit on v2x-CommTxPoolNormal in v2x-InterFreqInfoList or p2x-CommTxPoolNormal in v2x-InterFreqInfoList in RRCConnectionReconfiguration; or 1> if zoneConfig is included in SL-V2X-Preconfiguration for the concerned frequency and the UE is configured to transmit on v2x-CommTxPoolList in SL-V2X-Preconfiguration for the concerned frequency:

2> select the pool configured with zoneID equal to the zone identity determined below and associated with the synchronization reference source;

A UE capable of V2X sidelink communication that is configured by upper layers to transmit V2X sidelink communication shall:

1> for each frequency used to transmit V2X sidelink communication, select a cell to be used as reference for synchronization and DL measurements in accordance with the following:

2> if the frequency concerns the primary frequency:

3> use the PCell (RRC_CONNECTED) or the serving cell (RRC_IDLE) as reference;

2> else if the frequency concerns a secondary frequency:

3> use the concerned secondary cell (SCell) as reference;

2> else if the UE is in coverage of the concerned frequency:

3> use the DL frequency paired with the one used to transmit V2X sidelink communication as reference;

2> else (i.e. out of coverage on the concerned frequency):

3> use the PCell (RRC_CONNECTED) or the serving cell (RRC_IDLE) as reference, if needed.

As described above, carrier aggregation is considered for V2X communication. In order to perform V2X sidelink carrier aggregation over multiple carriers, a selection of transmission (TX) carriers among the available configured carriers needs to be considered. While a UE has a limited capability, the UE has to prioritize carrier(s) with consideration of supportive TX capability. Even in the UE which has no limitation of TX capability, the carrier selection should be done.

Various factors can be considered for TX carrier selection for V2X sidelink communication. First, CBR may be considered for the TX carrier selection in sidelink carrier aggregation. In addition, priority indicated by PPPP may be considered for the TX carrier selection in sidelink carrier aggregation. Furthermore, UE capability on sidelink carrier aggregation may be considered for the TX carrier selection. AS may be aware of candidate V2X frequencies for V2X packet transmissions, which configured by upper layers. Configuration/Pre-configuration of sidelink carriers (at least one candidate set of sidelink component carrier (CC)) for the TX carrier selection may be supported.

Specifically, PPPP and CBR may only be considered in the TX carrier selection. Carriers selected by upper layer based on a certain service are only considered. CBR level can be measured by the UE and/or signaled by the network for a certain pool or carrier. Any criteria in the following can be configured by the BS or pre-configured to cover in-coverage (IC) scenario and out-of-coverage (OOC) scenario. The PPPP of MAC PDU indicates lowest PPPP value of the logical channels in the MAC PDU.

Meanwhile, one aspect to be considered for proper TX carrier selection is coexistence between dedicated short range communication (DSRC) and LTE-V2X in intelligent transport system (ITS) carrier (i.e. 5.9 GHz). According to 5G automotive association (5GAA), both LTE-V2X and DSRC have equal rights to operate in the 5.9 GHz band. If the carrier is already occupied by DSRC and there are other candidate carriers for transmission, it is reasonable for LTE-V2X to avoid using the carrier occupied by DSRC as much as possible to avoid the mutual interference between two different radio access technologies (RATs). In this sense, from a perspective of transmission, it is necessary to prioritize some carriers which are not shared by DSRC.

To handle this issue, a scheme to avoid carriers which are shared by DSRC and LTE-V2X may be considered. The present invention proposes a method and apparatus for handling coexistence with DSRC carrier.

FIG. 5 shows a method for handling coexistence with DSRC carrier according to an embodiment of the present invention. In the below description, it is assumed that the first radio technology is sidelink transmission or uplink transmission in 3GPP LTE or NR, while the second radio technology is IEEE radio technology (such as DSRC or WLAN) or Bluetooth. However, the present invention is not limited thereto. In addition, it is assumed that in the below description the network corresponds to gNB, eNB, MME, AMF, ProSe server or V2X server.

In step S500, the UE obtains a first congestion level on a resource set for a first radio technology. The first congestion level may be obtained by measuring the first congestion level on the resource set for the first radio technology in a duration. Alternatively, the first congestion level may be obtained by receiving information on the first congestion level on the resource set for the first radio technology from a network. The first congestion level may be a first CBR. The resource set may correspond to at least one of a frequency band, a carrier, a resource pool, or a cell.

In step S510, the UE determines a second congestion level for the first radio technology by applying an offset to the first congestion level when a second radio technology which shares the resource set with the first radio technology is identified. The second congestion level may be a second CBR. The second radio technology may be identified by detecting transmission of the second radio technology. Alternatively, the second radio technology may be identified by receiving information on the second radio technology from a network. The offset may have a negative value or a positive value. Information on the offset may be received from a network. Alternatively, the offset may be determined by a pre-configuration stored in the UE. The offset may be configured/provided per PLMN, per tracking area, per frequency band, per cell, per area, or per frequency. If the second radio technology is not identified, the offset may not be applied to the first congestion level.

Specifically, for the case where multiple frequencies for V2X are supported, a mapping between service types and V2X frequencies is configured by upper layers. Similarly, specific carrier(s) which shared with DSRC may be indicated by upper layer. After reception of configuration, UE MAC (or UE RRC) selects appropriate candidate TX carrier (s) based on measured CBR level and associated PPPP of MAC PDU.

During the TX carrier selection phase for transmission, carrier(s) shared with DSRC may be deprioritized. If candidate carrier(s) are currently shared with DSRC, a UE may apply a negative offset or positive offset to the first congestion level of the carrier. For example, the UE may apply a negative offset or positive offset to the CBR level of the carrier which is measured or received from the network. By applying the offset to the CBR level of the carrier, extra CBR level may be added to the carrier. Such the offset may be configured by the network or may be determined by a pre-configuration stored in the UE.

In step S520, the UE selects a carrier based on the second congestion level for the first radio technology. Due to application of the offset to the carrier shared with DSRC, the carrier shared with DSRC can have a lower selection probability than other carriers even though the carrier is much better than other carriers. The UE may further determine a transmission parameter based on the second congestion level for the first radio technology.

In step S530, the UE performs transmission on the selected carrier.

According to embodiment of the present invention shown in FIG. 5, the carrier shared with DSRC can have much higher CBR level than the measured/received CBR level of the carrier by applying the offset to the measured/received CBR level of the carrier. Therefore, considering CBR is considered in the TX carrier selection for V2X sidelink communication, it can be avoided to select the carrier shared with DSRC.

FIG. 6 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to obtain a first congestion level on a resource set for a first radio technology. The first congestion level may be obtained by measuring the first congestion level on the resource set for the first radio technology in a duration. Alternatively, the first congestion level may be obtained by receiving information on the first congestion level on the resource set for the first radio technology from a network. The first congestion level may be a first CBR. The resource set may correspond to at least one of a frequency band, a carrier, a resource pool, or a cell.

The processor 610 is configured to determine a second congestion level for the first radio technology by applying an offset to the first congestion level when a second radio technology which shares the resource set with the first radio technology is identified. The second congestion level may be a second CBR. The second radio technology may be identified by detecting transmission of the second radio technology. Alternatively, the second radio technology may be identified by receiving information on the second radio technology from a network. The offset may have a negative value or a positive value. Information on the offset may be received from a network. Alternatively, the offset may be determined by a preconfiguration stored in the UE. The offset may be configured/provided per PLMN, per tracking area, per frequency band, per cell, per area, or per frequency. If the second radio technology is not identified, the offset may not be applied to the first congestion level.

The processor 610 is configured to select a carrier based on the second congestion level for the first radio technology. The UE may further determines a transmission parameter based on the second congestion level for the first radio technology.

The processor 610 is configured to control the transceiver 630 to perform transmission on the selected carrier.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiment of the present invention shown in FIG. 6, the processor 610 may be configured to apply the offset to the measured/received CBR level of the carrier shared with DSRC so that the carrier can have much higher CBR level than the measured/received CBR level of the carrier. Therefore, considering CBR is considered in the TX carrier selection for V2X sidelink communication, it can be avoided for the processor 610 to select the carrier shared with DSRC.

FIG. 7 shows a network node to implement an embodiment of the present invention. The present invention described above for network side may be applied to this embodiment. The network node may be a gNB, eNB, MME, AMF, ProSe server or V2X server.

A network node 700 includes a processor 710, a memory 720 and a transceiver 730. The processor 710 may be configured to implement proposed functions, procedures and/or methods described in this description. Layers of the radio interface protocol may be implemented in the processor 710. Specifically, the processor 710 may be configured to control the transceiver 730 to transmit information on the second radio technology for the UE to identify the second radio technology. The processor 710 may be configured to control the transceiver 730 to transmit information on the offset to be applied to the first congestion level.

The memory 720 is operatively coupled with the processor 710 and stores a variety of information to operate the processor 710. The transceiver 730 is operatively coupled with the processor 710, and transmits and/or receives a radio signal.

The processor 710 may include ASIC, other chipset, logic circuit and/or data processing device. The memory 720 may include ROM, RAM, flash memory, memory card, storage medium and/or other storage device. The transceiver 730 may include baseband circuitry to process radio frequency signals. When the embodiments are implemented in software, the techniques described herein can be implemented with modules (e.g., procedures, functions, and so on) that perform the functions described herein. The modules can be stored in the memory 720 and executed by the processor 710. The memory 720 can be implemented within the processor 710 or external to the processor 710 in which case those can be communicatively coupled to the processor 710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
    obtaining a first congestion level on a resource set for a first radio technology;
    determining a second congestion level for the first radio technology by applying an offset to the first congestion level when a second radio technology which shares the resource set with the first radio technology is identified;
    selecting a carrier based on the second congestion level for the first radio technology; and
    performing transmission on the selected carrier.

2. The method of claim 1, wherein the first congestion level is obtained by measuring the first congestion level on the resource set for the first radio technology.

3. The method of claim 1, wherein the first congestion level is obtained by receiving information on the first congestion level on the resource set for the first radio technology from a network.

4. The method of claim 3, wherein the network is a gNB, an eNodeB (eNB), a mobility management entity (MME), an access and mobility management function (AMF), a proximity-based services (ProSe) server or a vehicle-to-everything (V2X) server.

5. The method of claim 1, wherein the first congestion level and the second congestion level are a first channel busy ratio (CBR) and a second CBR, respectively.

6. The method of claim 1, wherein the resource set is a frequency band, a carrier, a resource pool, or a cell.

7. The method of claim 1, wherein the second radio technology is identified by detecting transmission of the second radio technology.

8. The method of claim 1, wherein the second radio technology is identified by receiving information on the second radio technology from a network.

9. The method of claim 1, wherein the offset has a negative value or a positive value.

10. The method of claim 1, wherein information on the offset is received from a network.

11. The method of claim 1, wherein the offset is determined by a pre-configuration stored in the UE.

12. The method of claim 1, wherein the offset is configured per public land mobile network (PLMN), per tracking area, per frequency band, per cell, per area, or per frequency.

13. The method of claim 1, further comprising determining a transmission parameter based on the second congestion level for the first radio technology.

14. The method of claim 1, wherein the first radio technology is a 3rd generation partnership project (3GPP) long-term evolution (LTE) or new radio access technology (NR), and
wherein the second radio technology is an institute of electrical and electronics engineers (IEEE) radio technology a dedicated short range communication (DSRC) or Bluetooth.

15. A user equipment (UE) in a wireless communication system, the UE comprising:
a memory;
a transceiver; and
a processor, operably coupled tot the memory and the transceiver, and configured to:
obtain a first congestion level on a resource set for a first radio technology,
determine a second congestion level for the first radio technology by applying an offset to the first congestion level when a second radio technology which shares the resource set with the first radio technology is identified,
select a carrier based on the second congestion level for the first radio technology; and
control the transceiver to perform transmission on the selected carrier.

* * * * *